Dec. 19, 1933.  E. WILKINSON  1,939,748
FEEDING DEVICE FOR LIVE STOCK
Filed April 24, 1931
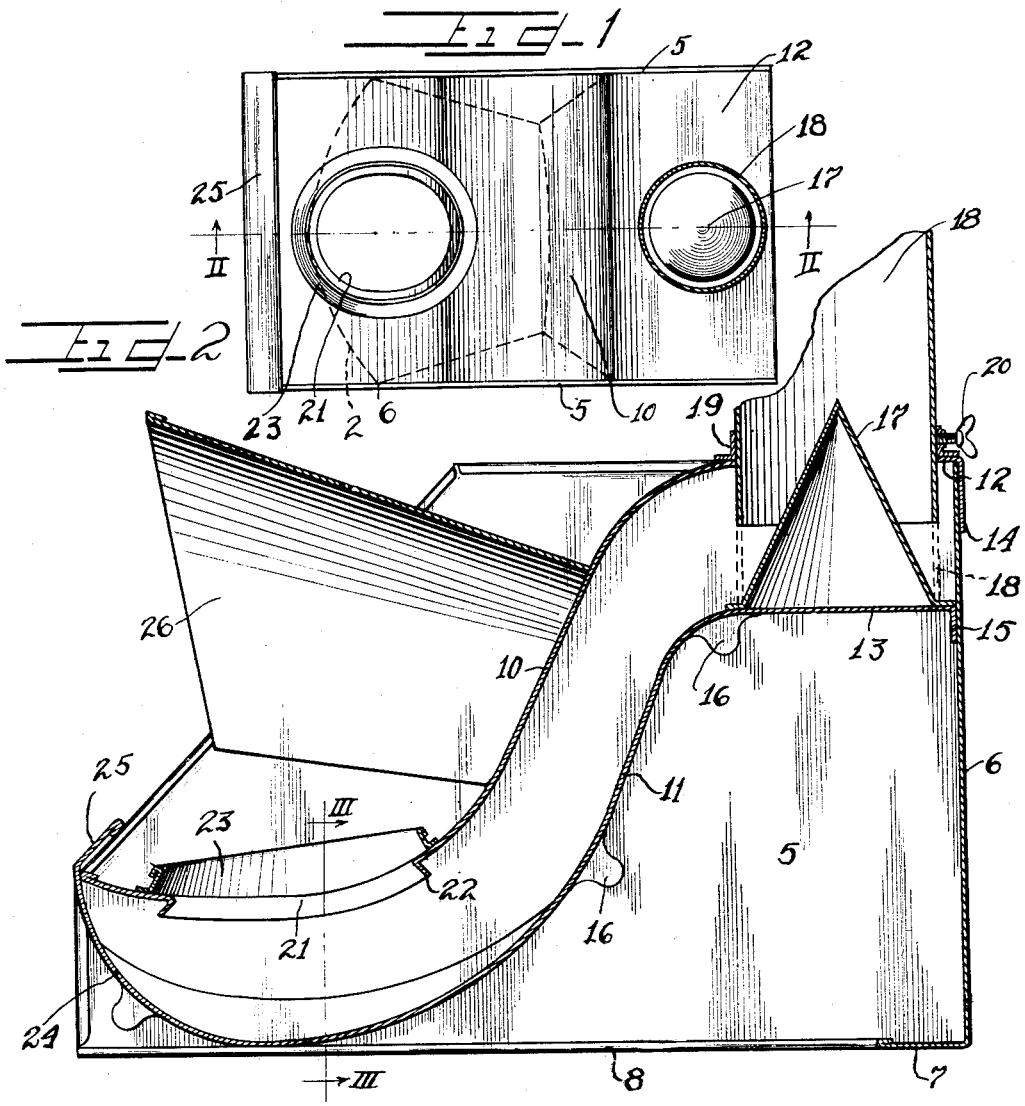
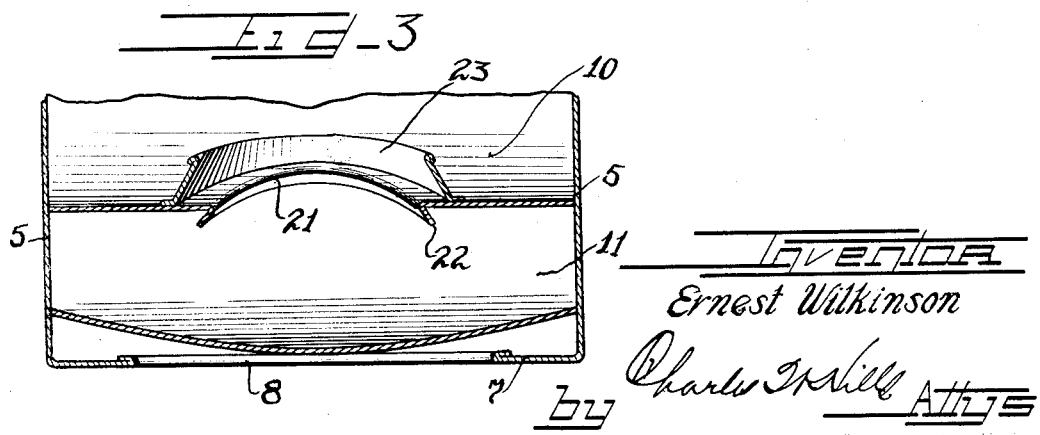
Inventor
Ernest Wilkinson
by Charles H. Hill Attys Patented Dec. 19, 1933

1,939,748

UNITED STATES PATENT OFFICE 1,939,748

FEEDING DEVICE FOR LIVE STOCK

Ernest Wilkinson, Chicago, Ill.

Application April 24, 1931. Serial No. 532,434

13 Claims. (Cl. 119—53)

This invention relates to improvements in feeding devices for live stock, the device being of the character usually placed upon the ground or in a pen, and is especially desirable for the feeding of small live stock, such as poultry, rabbits, young pigs, and the like, although the device may have many and various uses as will be apparent to one skilled in the art.

In the past, many and various devices have been developed for the feeding of small live stock, but one particular disadvantage of these devices is the objectionable amount of feed wasted by the live stock in eating from the devices. Especially is this true with regard to rabbits which have a habit of putting their paws into their food, especially if this food be grain, and scattering the same. When scattered and trampled upon, the food is not eaten by the animals. When it is borne in mind that the rabbit industry is now developed to a considerable commercial extent, and there are many farms which breed rabbits by the thousands, waste of food is a material and objectionably large item of expense.

Moreover, with many of the commonly known feeding devices and especially those customarily used in connection with the feeding of rabbits, it is necessary for an attendant to place a certain amount of feed in the device at relatively short periods of time; in fact, every time it is desired that the rabbits should eat. The necessary rounds of the rabbit pens by attendants at every feeding time is also a material and objectionably large item of expense in the rabbit industry.

With the foregoing as well as many other objections in view, it is an object of the present invention to provide a feeding device for small live stock so constructed and arranged that there is little or no possibility of an animal scattering food from the device, the animal only eating its meal from the device and not destroying or scattering any of the remainder.

It is also an object of this invention to provide a feeding device for small live stock which prevents the animal from jumping or climbing upon the device and walking upon the food to be eaten.

Another object of this invention is the provision of a feeding device for small live stock which may be adjusted to automatically provide a suitable quantity of food over a protracted length of time, during which time the device needs no attention whatsoever.

It is also an object of this invention to provide a feeding device which may be made of metal, and the metal so treated that rabbits and similar animals will not lick the same during cold weather and thus injure themselves.

A still further object of this invention is the provision of a feeding device for small live stock so constructed that the live stock are unable to overturn the device, the device also being very durable and not subject to breakage.

While some of the more salient features, characteristics and advantages of a device embodying this invention have been above pointed out, others will become apparent from the following disclosures.

The invention includes these and features of construction and combinations of parts hereinafter described and shown in a preferred form in the drawing, as more particularly indicated by the claims.

On the drawing:

Figure 1 is a top plan view of a device embodying principles of the present invention, with portions shown dotted for the purpose of clarity.

Figure 2 is an enlarged fragmentary vertical sectional view of the structure shown in Figure 1, taken substantially as indicated by the line II—II of Figure 1.

Figure 3 is a fragmentary vertical sectional view through a portion of the device taken substantially as indicated by line III—III of Figure 2.

As shown on the drawing:

In the illustrated embodiment of this invention, there is shown a feeding device including a jacket made up of a pair of side walls 5 and a rear wall 6, the several walls being integral with each other, or separate and secured together in any suitable manner, as desired. As seen clearly in Figures 2 and 3, the lower edges of the side walls 5 and the rear walls 6 are inwardly folded along the lower margins to form a flange 7 preferably having beaded edge 8 upon which the device is normally seated. The exposed edges of the side walls are also preferably beaded to prevent an animal from cutting or injuring himself by contact therewith. As seen in Figure 2, the side walls are cut so as to provide a tapering portion 9 which slopes toward the front of the device whereby better access is afforded to the feed contained within means later to be described.

Within the jacket formed by the walls 5 and 6 is a forwardly sloping feed chute defined by an upper wall 10 and a lower wall 11, each of which has a substantially horizontal rear portion, 12 and 13 respectively, and an arcuately sloping forward portion. The walls 10 and 11 are each flanged at the rear margins thereof as at 14 and 15, respectively, and the flanges are spot-welded, brazed, or secured to the casing wall 6 in any other desired manner.

At spaced intervals therealong, the lower wall 11 is also provided with integral lugs 16 on each side thereof which are brazed, or welded, or otherwise secured to the side walls 5 of the jacket. As will later appear, the front portion of the upper wall 10 is supported by the lower wall 11.

Mounted on the horizontal portion 13 of the lower wall 11 is an upwardly extending conical element 17 which projects upwardly into a magazine 18 movable vertically through a suitable aperture in the horizontal portion 12 of the upper wall 10. The magazine 18 may be of any desired length, and is preferably in communication with any suitable form of hopper (not shown in the drawing), whereby a supply of feed for any desired period of time is provided. An annular collar 19 mounted on the portion 12 of the wall 10 suitably supports the magazine 18 in the proper vertical position, and this collar is provided with a thumb set screw 20 by the aid of which the magazine may be supported with its lower end any desirable distance from the base of the distributor 17. If it is desired to cut off the supply of feed, it is simply necessary to loosen the thumb screw 20 and push the magazine downwardly until it contacts with the lower edge of the distributor 17, as indicated by the dotted lines in Figure 2. When it is desired to permit a flow of feed, it is simply necessary to raise the hopper to the desired height and secure the same in this position with the aid of the set screw 20, thus providing a continuous supply of feed for any desired length of time.

The feed, after leaving the magazine 18, flows forwardly down the sloping chute until it reaches a position at the front portion of the chute. A suitable opening 21 is provided in the front somewhat flattened portion of the chute wall 10 to afford access to the contents of the chute. The opening 21 is preferably formed by cutting the chute wall 10 and then inwardly bending the margins adjacent the cut to afford a smooth edged opening that will not injure the eating animal, and also to provide an inwardly and angularly extending flange 22 which aids in preventing feed from piling up beneath the opening 21. A member 23 in the nature of a flange is secured to the chute wall 10 in any desired manner so as to extend upwardly and inwardly therefrom toward the center of the opening 21. As is seen clearly in Figures 2 and 3, the flange 23 is secured to the chute wall 10 along a line surrounding but spaced from the opening 21, so, in effect, there is a laterally extending flange and an upwardly extending flange immediately adjacent the opening, which flanges cooperate effectively to prevent an animal from scattering food from the chute through the opening on and around the device.

To insure that all the feed provided will be eaten by the animals and no material amount of food will be left in corners of the device, the lower chute wall 11 is turned smartly upwardly as at 24 in the forward portion thereof so that any feed which passes the opening 21 will immediately slide back into position beneath the opening 21. To further insure against waste in feed, a flange 25, which may be integral with the chute wall 11, as shown in the drawing, or may be added if so desired, extends across the front portion of the chute wall 10 from one side wall 5 to the other side wall. The flange 25 slopes inwardly as seen more clearly in Figure 2, and any feed which may be dropped by an eating animal will be held by the flange 25 on the upper chute wall 10 adjacent the opening 21 where it is easily accessible and cannot be rendered unfit for eating.

In order to prevent an animal from jumping or climbing upon the device and especially upon the upper chute wall 10 in which position the animal might walk upon the feed through the opening 21, a visor or hood 26 is provided, the hood having an upwardly turned flange 27 at its inner end, which flange is secured as by brazing or welding to the chute wall 10. The hood is sufficiently close to the opening 21 to permit an animal to extend its head over the flange 25 and into the opening and to prevent the animal from climbing on the device adjacent the opening.

It will undoubtedly be noted that the device may very expeditiously be made of metal, and when used for rabbits, the metal is preferably coated with a suitable compound, such as porcelain, which will prevent a rabbit from licking the metal in cold weather and thus injuring itself.

From the foregoing, it will be apparent that I have provided a feeding device for small live stock which effectively eliminates waste of feed, and prevents the animals from otherwise destroying food within the device. It will also be noted that the device can be adjusted for automatic feeding so that a continuous supply of feed may be provided over any desired length of time, the device, in the interim, requiring no attention whatsoever. In addition, the present invention is very simple in construction, exceedingly durable, and may be economically manufactured.

I claim:

1. In a device of the character described, a feed chute extending downwardly and forwardly and provided with an aperture adjacent the forward portion through which the feed may be reached, and an upwardly extending flange surrounding said aperture but spaced therefrom for preventing the scattering of feed from said chute.

2. In a feeding device for live stock, a forwardly sloping feed chute having an unobstructed aperture therein to permit access to the feed in the chute, means adjacent to and extending substantially parallel to the boundary of said aperture to prevent the scattering of food therefrom, and a hood spaced above and projecting over said aperture.

3. In a feeding device for live stock, means for holding feed in position to be eaten, said means having an opening therein to afford access to the feed, means adjacent said opening to prevent scattering of feed therefrom by an animal user, and means extending over said opening sufficiently close thereto to permit an animal to feed but not climb upon said first means.

4. In a device of the character described, a feed chute having an aperture therein to afford access to the feed, side walls adjacent said chute and projecting above the forward part thereof, a front inwardly sloping flange, connecting said side walls above said chute, and means for preventing an animal from assuming a position on said chute.

5. In a feeding device for live stock a feed chute including a pair of spaced walls sloping downwardly and forwardly, the upper wall having an aperture therein to afford access to the feed in said chute, the lower wall curving upwardly adjacent the forward portion thereof to meet said upper wall and maintain feed beneath said aperture, means closing the sides of said chute, and means adjacent said aperture for preventing the scattering of feed therethrough.

6. In a feeding device for live stock, a jacket having an open forward portion, a feed chute sloping forwardly in and supported at the proper angle by said jacket and having an aperture therein to afford access to the feed, said aperture being accessible through the forward portion of said jacket, means for controlling the feed supply in said chute, and means associated with said chute for preventing the scattering of feed therefrom through said aperture.

7. In a feeding device for live stock, a sloping feed chute having an aperture therein to afford access to feed contained in said chute, and an upwardly extending flange surrounding said aperture and secured to said chute a distance from said aperture, said flange sloping inwardly, whereby scattering of feed by an animal is prevented.

8. In a feeding device for live stock, a sloping feed chute having an opening in the forward portion thereof to afford access to the contents of the chute, means for preventing the scattering of feed through said opening, side walls extending above said chute, and a transverse flange extending above the forward portion of said chute over which an animal must place its head to reach said opening.

9. In a feeding device for live stock, a feed container having an opening to afford access to the contents thereof, an inwardly extending flange around said opening, and a flange surrounding said opening and extending upwardly from said container from a line spaced from said opening.

10. In a feeding device for live stock, a jacket shaped to provide a base and having an open front region, a feed chute supported at the proper angle by said jacket and having an opening to afford access to the contents thereof, means adjacent said opening to prevent the scattering of feed from said device, flange means projecting above said chute in front of said opening, a feed magazine associated with the rear portion of said chute, and feed distributing means disposed beneath said magazine.

11. As an article of manufacture, a feeding device for live stock, comprising a feed chute having an unobstructed opening therein to afford access to the contents of the chute, means on said chute adjacent said opening to prevent scattering of feed, and all parts of said device accessible to an animal being covered with a compound which discourages animals from licking said parts.

12. In a feeding device for live stock, a feed chute having an unobstructed opening therein to afford access to the contents thereof, and means on said chute adjacent to but not obstructing said opening to hold feed within the vicinity of said opening and prevent an animal from scattering feed.

13. In a feeding device for live stock, a food container having an unobstructed opening therein to afford access to the contents thereof, and means adjacent said opening but not obstructing the same and arranged to hold feed within the vicinity of said opening and prevent an animal from scattering feed.

ERNEST WILKINSON.